United States Patent [19]

Judd et al.

[11] Patent Number: 4,477,697

[45] Date of Patent: Oct. 16, 1984

[54] METHOD AND CIRCUITRY FOR ENCODING TELEPHONE RINGING SIGNALS

[75] Inventors: Thomas H. Judd, Madison; Michael C. King, Freehold; Edmund T. Klemmer, Holmdel; Martin H. Singer, Fair Haven, all of N.J.

[73] Assignee: AT&T Bell Laboratories, Murray Hill, N.J.

[21] Appl. No.: 443,391

[22] Filed: Nov. 22, 1982

[51] Int. Cl.³ .......................................... H04M 13/00
[52] U.S. Cl. .............................. 179/84 T; 179/84 SS; 179/84 VF; 179/17 E
[58] Field of Search ................. 179/84 R, 84 A, 84 B, 179/84 C, 84 VF, 84 SS, 84 T, 17 E, 51 AA, 6.16, 2 A, 99 A, 99 P; 340/311.1, 825.44

[56] References Cited

U.S. PATENT DOCUMENTS

| | | | |
|---|---|---|---|
| 3,740,490 | 6/1973 | McAlonie et al. | 179/84 VF |
| 3,763,326 | 10/1973 | Murto et al. | 179/84 T |
| 3,867,585 | 2/1975 | Morstadt | 179/84 T |
| 4,081,617 | 3/1979 | Clark | 179/84 T |
| 4,160,240 | 7/1979 | Partipilo | 340/825.44 X |
| 4,267,448 | 6/1981 | Embree et al. | 179/84 T |
| 4,282,410 | 8/1981 | Gauthier et al. | 179/51 AA X |
| 4,293,737 | 10/1981 | Cepelinski | 179/17 E |
| 4,309,574 | 1/1982 | Sublette et al. | 179/84 T |
| 4,330,780 | 5/1982 | Masaki | 340/825.44 |

Primary Examiner—Stafford D. Schreyer
Assistant Examiner—James L. Dwyer
Attorney, Agent, or Firm—John A. Caccuro

[57] ABSTRACT

The method and apparatus encodes telephone ringing to identify both the origin and destination of a received call. The ring envelope of the ringing signal is divided into two segments. During the first segment, call origin information is encoded by varying the number of pulses or the pulse widths of a fixed frequency signal. Call destination information is encoded by time division multiplexing different frequencies into subsegments of the second segment.

32 Claims, 5 Drawing Figures

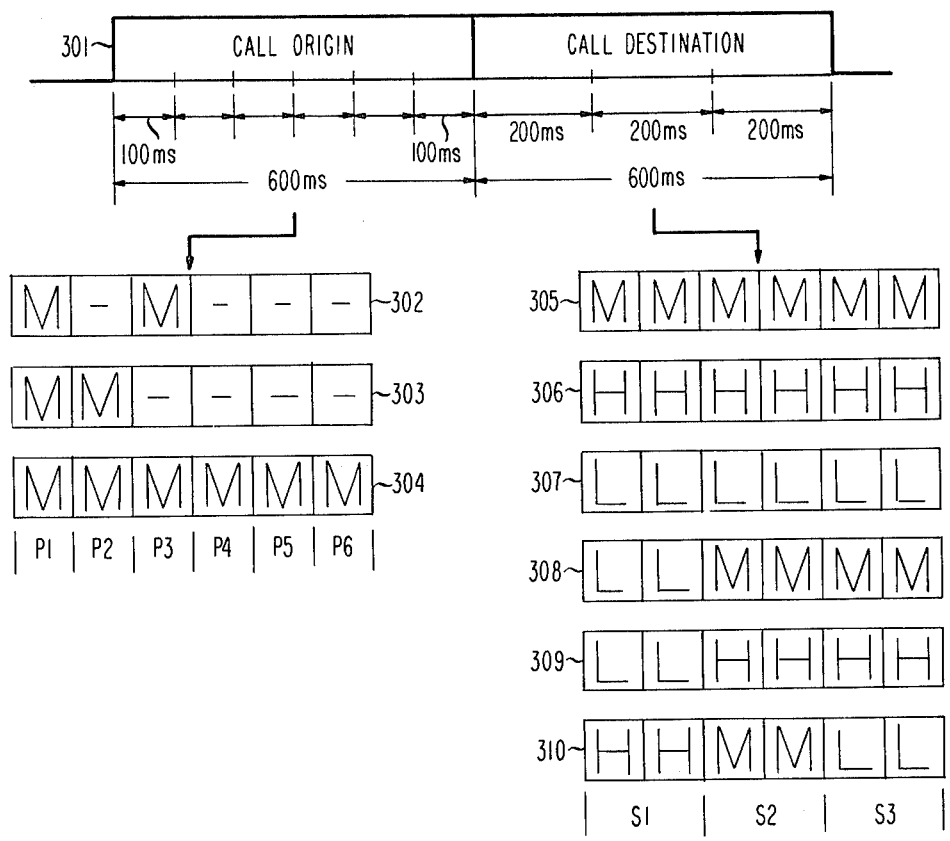

METHOD AND CIRCUITRY FOR ENCODING TELEPHONE RINGING SIGNALS

TECHNICAL FIELD

This invention relates to ring signaling and more particularly, to a method and circuitry for encoding telephone ringing signals.

BACKGROUND OF THE INVENTION

Telephone users often find it desirable to have information about the origin and destination of a received call prior to the call being answered. Because the telephone user may not be near to a telephone, the use of visual signaling may not provide the information desired. Some telephone communication systems now provide users with distinctive ringing signals which identify whether the received call is an external (central office) call or an internal (intercom) call. Additional information, such as the priority of an internal call, is also incorporated into this distinctive ringing signal format.

In other telephone communication systems, users are provided with call destination information using a personalized ringing signal. Personalized ringing enables each user to determine whether he or she is the destination of an incoming call by listening to and decoding the ring signal. In certain applications, telephone users desire both the distinctive and personalized ringing features in a telephone communication system. Existing telephone communication systems have not provided such a capability.

SUMMARY OF THE INVENTION

An encoded telephone signaling method and apparatus is disclosed which provides both distinctive (call origin information) and personalized (call destination information) signals within the same audible ringing pattern. The ring pattern or envelope is partitioned into two segments. The first segment is used to provide call origin information (distinctive ringing) and the second segment is used to provide call destination information (personalized ringing). Within the first segment, origin information is encoded using variables such as the width and the number of pulses of a single frequency audio signal. During this first segment, no signal is present in the time period between pulses. Call destination information is encoded by time division multiplexing different audio frequencies into fixed subsegments of the second segment. As distinguished from the first segment, however, a signal is always present during the second segment.

In a preferred embodiment, a common control module of a communication system transmits ringing signals in a coded digital format to the called station. The called station receives and decodes the coded digital ringing signal into prefix and suffix segments. The prefix segment provides call origin information such as whether the call is an inside call (intercom), an outside call (central office), or a priority call. The suffix segment provides call destination information to identify which party should answer the call.

Circuitry converts the digital call origin and destination information into an analog composite ringing signal having, respectively, prefix and suffix segments. In one embodiment of the present invention, the prefix segment is 600 milliseconds (MS) long and is divided into six 100 MS intervals while the suffix segment is 600 MS long and is divided into three 200 MS intervals. A programmable tone generator is selectively enabled and frequency programmed during the various time intervals to generate the composite ringing signal. The composite ringing signal is outputted to a transducer which outputs the desired coded ringing signal.

BRIEF DESCRIPTION OF THE DRAWING

The characteristics and operation of the present invention will be more apparent from the following detailed description taken in conjunction with the drawing in which:

FIG. 3 shows the repertoire of encoded ringing signal waveforms;

FIG. 4 shows the format of the digital message representation of the encoded ringing signal.

DETAILED DESCRIPTION

Figure 1:
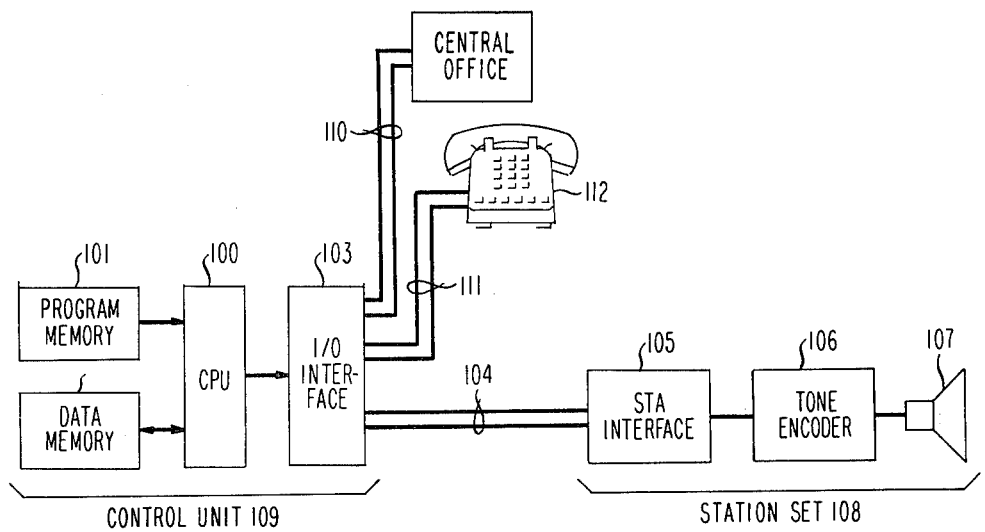
FIG. 1 is a simplified block diagram of a telephone communication system including the present invention.

The present invention is implemented as part of a telephone communication system having multiple key telephone station sets connected to a common control module. Shown in FIG. 1 is a simplified block diagram of such a telephone communication system incorporating the present invention. The system includes common control unit 109 which connects to one or more central office lines, such as 110, and which connects to two or more station sets, such as 108 and 112, via facilities 104 and 111, respectively. Control unit 109 establishes and controls all intercom and central office line communications. Program memory 101 provides instructions to central processor unit (CPU) 100 for controlling the various operating features and functions of the system. Data memory 102 is utilized by the CPU for storing and accessing data associated with performing the various functions and features programmed in program memory 101. In the preferred embodiment CPU 100 is a microprocessor, program memory 101 is read-only-memory (ROM) and data memory 102 is random access memory (RAM). The input/output interface circuit 103 contains the well-known switching, network control, and line circuits required by the system to establish, maintain and terminate communications.

Station set 108 includes an interface 105, tone encoder 106, and speaker 107. The telephone handset and other well-known circuits and apparatus of station set 107 are part of interface 105 and operate in the conventional manner. Interface 105 also conditions the signals sent to and received from facility 104 for use with tone encoder 106. Tone encoder 106 includes circuitry for converting binary (digital) ring data words received from common control unit 109 into a ringing signal which has been encoded with call origin and call destination information. Speaker or transducer 107 outputs the encoded ring signal to the user.

With joint reference to FIG. 1 and FIG. 4, control module 109 is programmed in a straightforward manner to periodically generate binary ring data words 401 for transmission to a station set in the ringing mode. The data utilized to form ring word 401 consists of data which is preprogrammed into program memory 101, programmed by the user into data memory 102, or determined by CPU 100 according to call characteristics. For example, control unit 109 is preprogrammed to generate the envelope bits M0 and M1 under certain call conditions. Similarly, by way of example, user programming determines the assignment of call destination (suffix) codes shown in bits M5, M6 and M7. Finally, by way of example, CPU could determine the call origin (prefix) information, such as whether the call is an intercom, central office, or high priority call and appropriately encode prefix information bits M3 and M4 of ring data word 401. Under program control, control unit 109 collects the various data from tables, memory locations, and/or registers and formats the data into ring data word 401 for transmission to the appropriate station set. A more detailed description of the parameters of ring data word 401 will follow in a later paragraph. While the invention as disclosed is directed to telephone communication systems, it is contemplated that the present invention can be implemented in a similar manner to convey information in other varieties of signaling systems.

Figure 2:
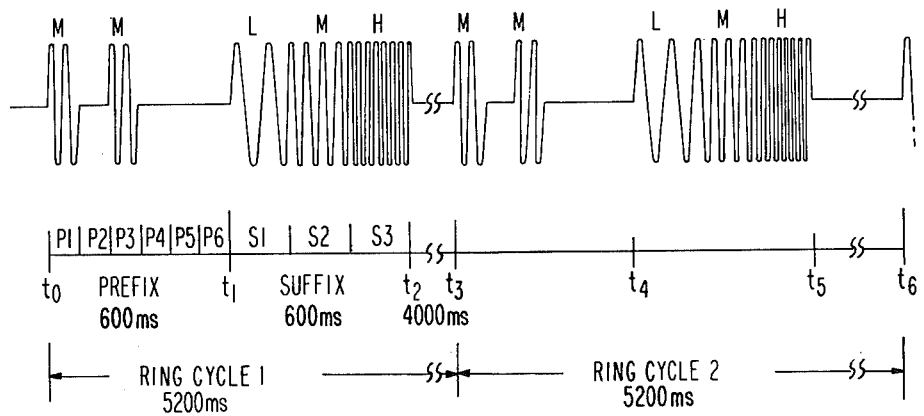
FIG. 2 shows an encoded ringing signal waveform according to the present invention.

Referring to FIG. 2, there is shown an encoded ringing signal waveform generated using the method and circuitry of the present invention. The present invention provides call origin information in a prefix segment (t0–t1) and provides call destination information in a suffix segment (t1–t2) of the active ring period of a ring cycle (t0–t3). In a preferred embodiment, the ring cycle (t0–t3) is 5200 MS and includes the active ring period (t0–t2) of 1200 MS and the quiescent period (t2–t3) of 4000 MS. While the time intervals illustrated in FIG. 2 are the approximate preferred values, the operation and utilization of the present invention cam, without deviating from the spirit or scope of the present invention, be adapted to provide other time intervals for the prefix, suffix, active and quiescent portions of a ring cycle.

The prefix segment (t0–t1) is subdivided into subsegments P1–P6 each 100 MS long, while the suffix segment (t1–t2) is subdivided into subsegments S1–S3 each 200 MS long. Each subsegment of the prefix segment can contain either a medium frequency tone or no tone. Each subsegment of the suffix segment can contain either a low L, medium M, or high H frequency tone.

A preferred repertoire of encoded ringing signal waveforms is illustrated in FIG. 3. Waveform 301 shows only the prefix and suffix segments, i.e., the active ring period, of a ring cycle. In the prefix and suffix waveform representations 302–304 and 305–310, respectively, each 100 MS time interval is represented by a L, M, H, or —character. The —character indicating the absence of a ringing signal and the L,M and H indicating, respectively, a low, a medium, or a high frequency tone. In a preferred embodiment, the approximate frequencies associated with L, M, H are respectively 530 Hz, 750 Hz and 1060 Hz. These frequencies were selected to be approximately one-half octave apart. Ring signals 302–304, show, for example, three origin information codes which can be used in the prefix segment of a ringing signal. Ring signals 305–310 show, for example, six destination information codes which can be used in the suffix segment. A ringing signal would be comprised of one code from the prefix segment and one code from the suffix segment, each code selected according to the origin and destination information that is to be signaled.

The prefix segment signal is comprised of an M tone having a varying pulse width and number. As noted, the prefix segment signal identifies an incoming call as being a priority, outside or inside telephone call. A ring signal for a priority telephone call as shown in 302, includes a 100 MS M tone in time slot P1, followed by a 100 MS absence of tone in time slot P2, followed by a 100 MS M tone in time slot P3 followed by a 300 MS absence of tone in time slots P4–P6, which is followed by the suffix segment tone.

A ring signal for an inside (e.g., intercom) telephone call as shown in 303 includes a 200 MS M tone in time slots P1 and P2, a 400 MS absence of tone in time slots P3–P6, and the suffix segment tone. An outside telephone call as shown in 304 includes a constant M tone for the entire 600 MS prefix segment followed by the suffix segment tone.

The suffix segment signal identifies which party should answer the telephone call. The suffix segment signal is comprised of fixed subsegments of 200 MS each of which can contain one of three tones L, M, or H. The code for one party is shown in 305 and includes a constant M tone for the entire 600 MS of the suffix segment. Similarly, 306 and 307 illustrate other constant tone codes for a second and third party using the H and L tones. The fourth and fifth called party codes comprises two different tones and are shown in 308 and 309. In both 308 and 309 subsegment S1 uses an L tone and subsegments S2 and S3 are at a constant tone M and H, respectively. The sixth called party code comprising three different tones is shown in 310 where subsegment S1 is an H tone, subsegment S2 is an M tone and subsegment S3 is an L tone. Thus, illustratively, a priority call to the sixth party would include the codes 302 and 310 as the prefix and suffix, respectively.

Note, when no called party identification is required, code 305 is utilized. The codes 306–310 are listed according to order that they would be added to provide maximum distinguishability between called parties. Thus, for identifying three called parties, the codes 305, 306 and 307 provide the most easily distinguished audible combination. Likewise, for five called parties, the codes 305–309 appear to be most distinguishable.

While the called party codes shown in 305–310 are the preferred codes, other tone combinations can be utilized to identify the called parties or to add additional called parties to the group. However, one requirement for establishing called party codes is that the tone selected for subsegment S1 of the suffix be different from the tone used in the prefix. Thus, since the prefix tone is M, the subsegment S1 tone should be either L or F to clearly identify the transition from the prefix to the suffix segment.

It should also be recognized that the number of combinations of pulses and widths utilized in the prefix segment can also be increased to provide other origin information. Once telephone users become used to listening for and decoding tones, it is anticipated that the number of combinations of suffix and prefix codes can be expanded.

As previously noted, the present method and apparatus for encoding telephone ringing system may be part of a communication system comprising a common control module connected over wire pairs to key telephone station sets. The present invention can be implemented in any communication system which can transmit the 8 bit data words, shown in FIG. 4, addressed to each station set of the system. Typically, this 8 bit data word can be part of a larger data word or one of several data words transmitted to a station set.

Shown in FIG. 4 is an 8 bit data word encoded at control unit 109 according to the present invention. This ring data word is transmitted by the control unit 109 to control the ring signal of a particular station set. Note, a ring data word is sent to a ringing telephone each ring cycle and hence is sent once every 5200 MS for as long as a ringing signal is desired.

With joint reference to FIGS. 1, 4 and 5 the preferred embodiment of the present invention will be described. The 8 bit ring data word 401 is received by interface 105 at a station set 108 and serially loaded into register 500 via the Data In lead. The contents of register 500, bits b0–b7, are stored in latch 501 using latch enable signal LE. The first two bits M0 and M1 of ring data word 401 are bits which describe the ring envelope. Bits M0 and M1 are decoded by command decoder 502 into an OFF signal (M0=0, M1=0), a STEADY signal (M0=1, M1=0), a SHORT signal (M0=0, M1=1), or a LONG signal (M0=1, M1=1).

When the LONG signal is outputted from command decoder 502, envelope counter 503 is programmed to count to 12 and reset. Envelope counter 503 counts a 10 Hz signal derived from a 20 Hz signal via a divide by two circuit 505. Each cycle of the 10 Hz signal represents to the basic 100 MS time interval for the prefix and suffix segments of the ring cycle. The present time interval of the counter is outputted in binary form over leads 506 to time slot decoder 507. Time slot decoder 507 decodes the time interval states of envelope counter 503 into six time slots P1–P6 of the prefix segment, bus 508, and the three subsegments S1–S3 of the suffix segment, bus 509.

As shown in FIG. 4, during the LONG envelope condition, when bits M0=M1=1, bit M2 represents the volume bit. A logic 1 for bit M2 indicates full volume while a logic 0 indicates a lower volume is to be outputted from volume adjust circuit 516 and speaker 107 of the station set. Bits M3 and M4 designate the four encoding states of D0–D3 of the prefix segment. In state D0, when bits M3 and M4 are both logic 0, no prefix signal is used. In state D1, when bits M3=1 and M4=0, the ring frequency pattern shown in 304 of FIG. 3 is generated. In state D2, when bits M3=0 and M4=1, the ring pattern shown in 303 of FIG. 3 is generated. In state D3, when bits M3=1 and M4=1, the ring pattern shown in 302 of FIG. 3 is generated. As shown in FIG. 5, bits M3 and M4 from latch 501 are decoded by prefix decoder 510 into the four states D0–D3.

Bits M5–M7 designate the encoding states of the suffix segment. Note, not all of the encoding states shown by 305–310 of FIG. 3 are implemented in the preferred embodiment shown in FIG. 5. In the preferred embodiment when bits M5, M6, and M7 are, respectively, logic 0, 0 and 1, a constant medium frequency (M) signal is generated during the suffix segment (encoding state 305). Otherwise, a logic 0 in a bit position of M5–M7 represents a low (L) frequency tone while a logic 1 represents a high (H) frequency tone.

Figure 5:
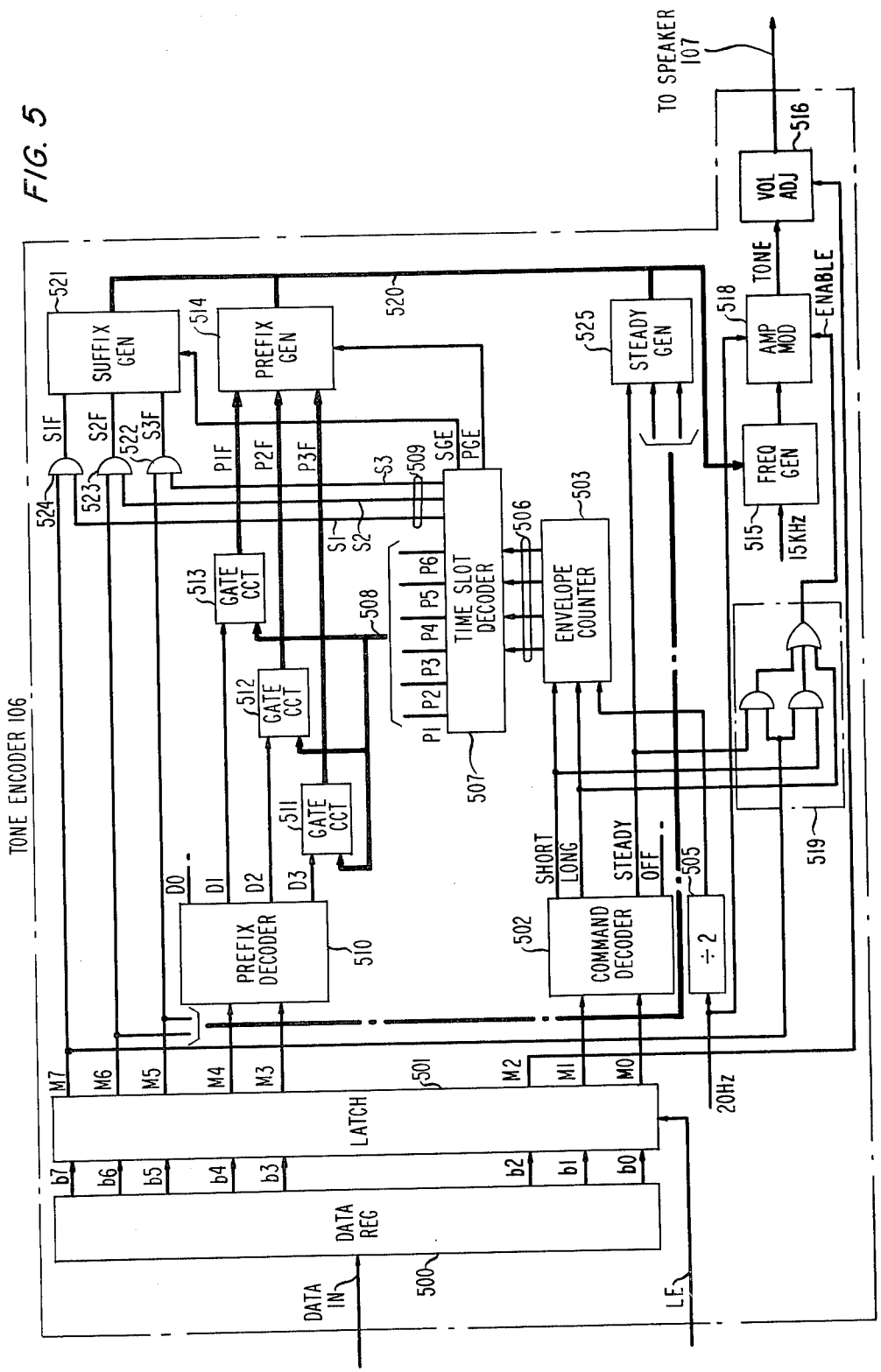
FIG. 5 shows a schematic diagram of circuitry for receiving and decoding telephone ringing signals in accordance with a preferred embodiment of the present invention.

With reference to FIG. 5 and assuming a LONG signal out of command decoder 502, the prefix and suffix frequency tones are generated as follows. Prefix decoder 510 decodes bits M3 and M4 into the four prefix encoded states D0–D3. Gate circuits 511, 512, and 513 receive outputs, respectively, D3, D2, and D1 from prefix decoder 510. Since only one of the signals D0–D3 can be at a logic 1, only one of the gate circuits 511–513 is enabled. Assuming that bit M3=1 and bit M4=1 then a D3 signal is generated by decoder 510 and gate 511 is enabled. Gate circuit 511 is a group of logic enabled by signal D3 to receive time slot pulses P1–P6 from time slot decoder 507. Gate circuit 511 generates a timing signal which is on during time slots P1 and P3 and off during time slots P2, P4, P5 and P6. Prefix generator 514 is enabled, only during the prefix interval, by the signal PGE from time slot decoder 507. Prefix generator 514 receives the timing signal from gate circuit 511 and generates the proper frequency preset code for frequency generator 515. Frequency generator 515 generates a medium frequency (M) tone having the timing of state D3, i.e., the waveform 202 of FIG. 2, which is outputted through volume adjust circuit 516 and speaker 107. Frequency generator 515 generates the M frequency tone of 750 Hz by counting down a 15 KHz signal by the present code of 20 received from prefix generator 514. Note, since lead LONG is at logic 1, the output of modulation logic 519, the ENABLE lead, is at logic 1 enabling amplitude modulator 518 for the entire sequence.

After the prefix segment of 600 MS has elapsed, lead PGE disables prefix generator 514 and lead SGE enables suffix generator 521 for 600 MS. During the suffix segment the 200 MS subsegments are generated on leads S1, S2, S3 of time slot decoder 507. The contents of bit position M5, M6, M7 are selectively gated, respectively, by gates 522, 523 and 524 using signals S3, S2 and S1. During the first subsegment, S1, suffix segment signal S1F causes suffix generator 521 to generate a preset code on bus 520 to frequency generator 515. Thus, for example, if bit M5 is logic 0 a low frequency L tone of 530 Hz is generated by frequency generator 515 in response to a preset code from suffix generator 521. Similarly, during subsegments S2 and S3, bit M6 and M7 cause suffix generator 521 to generate the appropriate preset code for frequency generator 515.

In a similar manner when bits M0 and M1 are 0 and 1, respectively, only lead SHORT from command decoder 502 is at logic 1. When lead SHORT is at logic 1 envelope counter 503 is programmed to count only to 6 and hence only the prefix generator 514 is activated. Thus, a ring signal having only a prefix segment would be generated. Referring to FIG. 4 and FIG. 5, in this mode prefix generator 514 receives signals P1F, P2F and P3F and outputs the frequency preset codes to generate the signals 302–304 of FIG. 3. Note, in this mode bits M5 and M6 provide codes for frequencies other than the medium frequency (M) tone during the prefix segment. This permits flexibility for additional distinctive (prefix) codes to be assigned. Additionally, bit M7 in the data word of FIG. 3 permits a modulation capability in the SHORT ringing signal state to provide additional distinctive ringing capability.

When a steady ringing signal is to be outputted at a station set, lead STEADY of command decoder 502 is at logic 1. In this mode envelope counter 503 is not enabled and hence no prefix or suffix segments are generated. However, steady generator 525 is enabled by lead STEADY to generate a frequency preset code on bus 520 as determined by the data in bit positions M5 and M6.

As shown in FIG. 4, if bits M5/M6 are 0/0, 0/1, 1/0 or 1/1 then, respectively, a medium (M), low (L), special (S), or a high (H) frequency preset code is generated by steady generator 525. This preset code enables frequency generator 515 to generate the appropriate frequency. Again, bit M2 determines the setting of volume adjust circuit 516. During the steady ringing signal mode, bit M7 determines whether the output from frequency generator 515 is to be amplitude modulated at a 20 Hz rate. Modulation logic 519 is activated by a logic 1 on leads STEADY and M7 so lead ENABLE is at logic 1 causing the modulation of frequency generator 515 output by amplitude modulator 518.

It should be noted that the preferred embodiment shown in FIG. 5 can be implemented using any of the well-known logic circuit arrangements. Moreover, the preferred embodiment shown in FIG. 5 could be modified in a straightforward manner to implement the other combinations of prefix and suffix codes provided in the ring data word of FIG. 4. For example, the variety of suffix codes described in FIG. 2 and FIG. 3 could be incorporated in a straightforward manner into the ring data word 401 of FIG. 4 and circuitry of FIG. 5.

Moreover, it should be recognized that ring data word 401 need not be transmitted from control unit 109 but could be locally generated at station set 108. Thus, for example, control unit 109 could send the well known distinctive ringing signal, or other equivalent prefix information, to station set 108. Station set 108 could be implemented in a manner similar to that described herein, to reconstruct the distinctive (prefix) information into the disclosed format and to append the destination (suffix) information to generate the coded telephone ringing signal described herein. Of course, the suffix information could also be preprogrammed locally at the station set via buttons or switches.

Furthermore, the circuitry described in FIG. 5 could likewise be located at control unit 109. In such an implementation, the resulting encoded ringing signal of FIG. 2 could be sent from control unit 109 to each station set. Each station set would thus only need a speaker, such as 107 of FIG. 1.

Finally, while the preferred embodiment is shown in FIG. 5 as discrete logic blocks, it should be noted that such circuits could be combined into a large scale integrated circuit or could be implemented as part of a microprocessor embodiment of a station set. What has been described is merely illustrative of the application of the principles of the present invention. Other methods and circuits can be implemented by those skilled in the art without departing from the spirit and scope of the present invention.

What is claimed is:

1. A communication system including a control unit and a plurality of station sets connected thereto, each station having a capability of communication with other stations of the system, said system comprising:
    means for dividing the active ring interval of an audible ringing signal into a first and a second segment,
    means for generating during said first segment one of a first group of encoded audio tone signals each signal of said first group providing, respectively, different information of a first type about a received call, and
    means for generating during said second segment of one of a second group of encoded audio tone signals each signal of said second group providing, respectively, different information of a second type about said received call.

2. A station set comprising:
    means for dividing the active ring interval of an audible ringing signal into a first and a second segment,
    means for generating during said first segment one of a first group of encoded audio tone signals each signal of said first group providing, respectively, different information of a first type about a received call, and
    means for generating during said second segment one of a second group of encoded audio tone signals each signal of said second group providing, respectively, different information of a second type about said received call.

3. The apparatus of claim 1 or 2 wherein said first type of information specifies the origin of said received call.

4. The apparatus of claim 1 or 2 wherein said first type of information specifies the priority of said received call.

5. The apparatus of claim 1 or 2 wherein said second type of information specifies the destination of said received call.

6. The apparatus of claim 1 or 2 wherein said dividing means divides said ring interval into said first and second segments having equal duration.

7. The apparatus of claim 1 or 2 wherein said first segment signal generating means generates audio tone signals each having a unique number of pulses of a single frequency.

8. The apparatus of claim 1 or 2 wherein said first segment signal generating means generates audio tone signals each having a unique pulse width of a single frequency.

9. The apparatus of claim 1 or 2 wherein each audio tone signal generated by said second segment signal generating means comprises at least one frequency of a group of frequencies.

10. The apparatus of claim 1 or 2 further including
    means dividing said second segment into two or more subsegments, each subsegment comprising one frequency of a group of audio frequencies.

11. The apparatus of claim 10 wherein each audio tone signal of said first segment is comprised of a single audio frequency and the first subsegment of said second segment following said first segment is comprised of an audio frequency different from said signal audio frequency of said first segment.

12. The apparatus of claim 1 or 2 further including
    means for dividing said first segment into multiple subsegments having selected subsegments including a single audio frequency signal and nonselected subsegments having no signal.

13. The apparatus of claim 1 or 2 further including
    means for dividing said first segment into at least six equal length subsegments and
    means for dividing said second segment into at least three equal length subsegments.

14. The apparatus of claim 13 wherein said first segment has selected subsegments including a single audio frequency signal and non-selected subsegments having no signal and wherein each of said three subsegments of said second segment includes one of two different audio frequencies with only one frequency change occurring during said second segment.

15. The communication system of claim 1 wherein said common control includes
    means for transmitting an encoded ringing signal specifying the audio signals to be generated by said first signal generating means located at a station and
    said station includes means for receiving said encoded ringing signal.

16. The station set of claim 2 further including
means for receiving an encoded ringing signal specifying the audio signals to be generated during said first and second segments.

17. The apparatus of claim 15 or 16 wherein said received encoded ringing signal is a binary signal.

18. The apparatus of claim 17 wherein said binary signal includes information specifying the audio signals to be generated by said second signal generating means.

19. The apparatus of claim 17 wherein said binary signal includes a second segment inhibit signal, said invention further including,
means for disabling said second segment signal generating means in response to said second segment inhibit signal.

20. The invention of claim 17 wherein said binary signal includes a single frequency enable signal, said invention further including
means for disabling said first and second segment signal generating means in response to said enable signal, and
means for generating a steady single audio frequency signal during said first and second segments in response to said enable signal.

21. The invention of claim 20 wherein said binary signal further includes an amplitude modulation enable signal, said invention further including
means for amplitude modulating at a predetermined rate the output of said single frequency generating means in response to said amplitude modulation enable signal.

22. A method of encoding an audible ringing signal of a communication system, said method comprising the steps of:
dividing the active ring interval of said ring signal into a first and second segment,
generating during said first segment one of a first group of encoded audible signals each signal of said first group identifying, respectively, different information about the origin of a received call, and
generating during said second segment one of a second group of encoded audible signals each signal of said second group identifying, respectively, different information about the destination of said received call.

23. A method of encoding a ringing signal of a station set comprising the steps of:
dividing the active ring interval of said ringing signal into a first and a second segment,
generating during said first segment one of a first group of encoded audible signals each signal of said first group identifying, respectively, different information about the origin of a received call, and
generating during said second segment one of a second group of encoded audible signals each signal of said second group identifying, respectively, different information about the destination of said received call.

24. The method of claim 22 or 23 wherein said first and second segments of the active ring interval are of equal duration.

25. The method of claim 22 or 23 wherein each signal of said first audible signal group has a unique number of pulses of a single frequency.

26. The method of claim 22 or 23 wherein each signal of said first audible signal group has a unique pulse width of a single frequency.

27. The method of claim 22 or 23 wherein each signal of said second audible signal group comprises at least one frequency of a group of frequencies.

28. The method of claim 22 or 23 further including the step of:
dividing said second segment into two or more subsegments, each subsegment comprising an audible signal which is one frequency of a group of frequencies.

29. The method of claim 28 wherein each audible signal of said first segment is a single frequency and the audible signal of first subsegment of said second segment following said first segment is a frequency different from said single frequency of said first segment.

30. The method of claim 22 or 23 further including the step of:
dividing said first segment into multiple subsegments having selected subsegments having a single frequency signal and having non-selected subsegments having no signal.

31. The method of claim 22 or 23 further including the steps of:
dividing said first segment into at least six equal length subsegments and
dividing said second segment into at least three equal length subsegments.

32. The method of claim 31 wherein
said first segment has selected subsegments including a single frequency audible signal and non-selected subsegments including no audible signal, and
said second segment has subsegments including two different audible frequencies and wherein only one frequency change occurs during said second segment.

* * * * *

UNITED STATES PATENT AND TRADEMARK OFFICE
CERTIFICATE OF CORRECTION

PATENT NO. : 4,477,697

DATED : October 16, 1984

INVENTOR(S) : Thomas H. Judd, Michael C. King, Edmund T. Klemmer and Martin H. Singer It is certified that error appears in the above-identified patent and that said Letters Patent is hereby corrected as shown below:

In the claims, Column 8, Line 43, "signal" should read --single--. Column 9, Line 36, "ring" (second occurrence) should read --ringing--.

Signed and Sealed this

Eighteenth Day of June 1985

[SEAL]

Attest:

DONALD J. QUIGG

Attesting Officer  Acting Commissioner of Patents and Trademarks